July 23, 1963 D. G. THOMAS 3,098,682
RAILWAY JOURNAL BEARING
Filed April 13, 1962 3 Sheets-Sheet 1
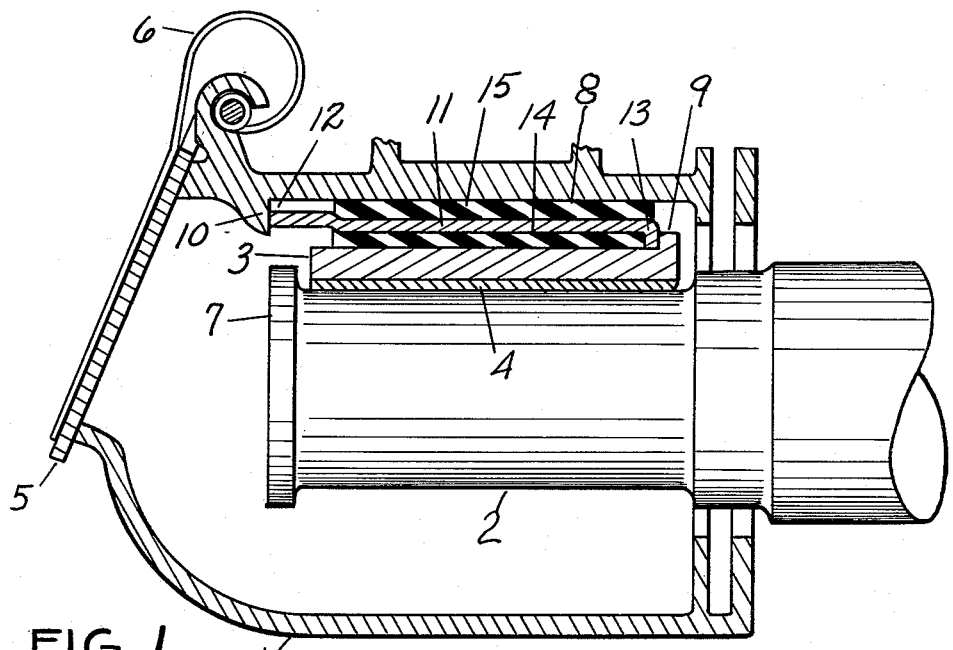
FIG. 1
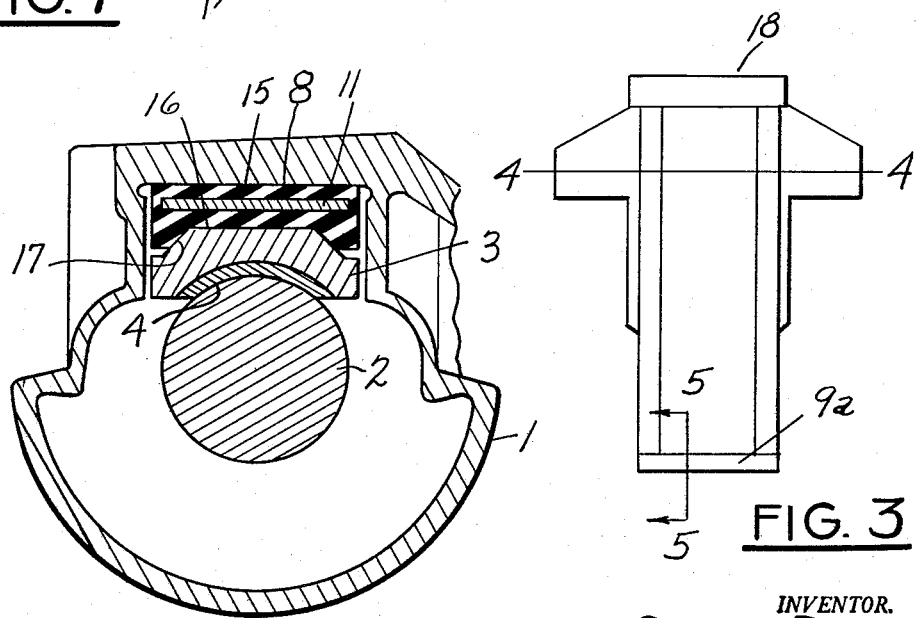
FIG. 2
FIG. 3
INVENTOR.
David G. Thomas
BY Ralph Hammar
Attorney

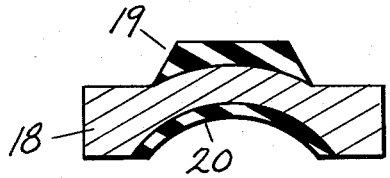
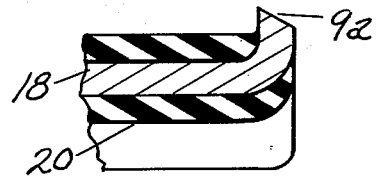
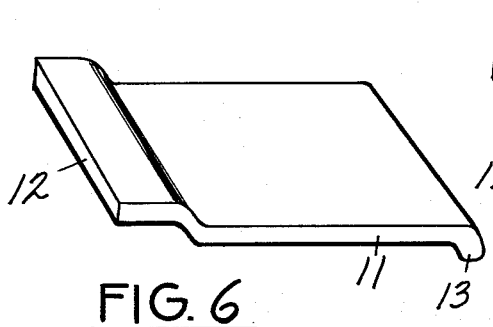
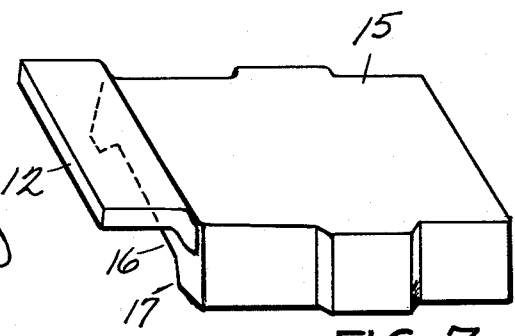
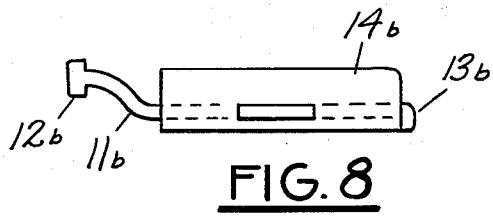
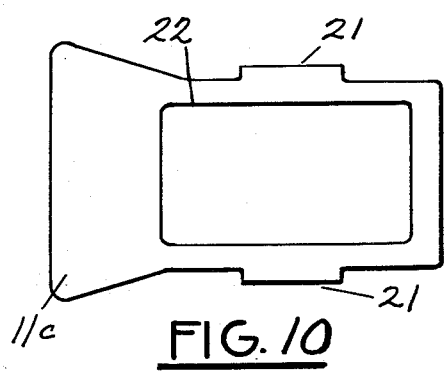
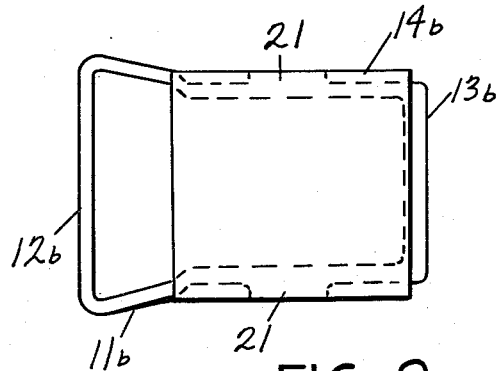
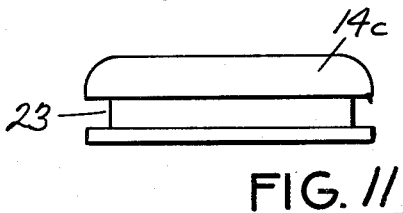

July 23, 1963  D. G. THOMAS  3,098,682
RAILWAY JOURNAL BEARING
Filed April 13, 1962  3 Sheets-Sheet 3

INVENTOR.
David G Thomas
BY Ralph Hammar
Attorney

United States Patent Office 3,098,682
Patented July 23, 1963

3,098,682
RAILWAY JOURNAL BEARING
David G. Thomas, Erie, Pa., assignor to Lord Manufacturing Company, Erie, Pa., a corporation of Pennsylvania
Filed Apr. 13, 1962, Ser. No. 187,411
9 Claims. (Cl. 308—54)

This invention is a railway journal bearing and wedge in which rocking, longitudinal and transverse loads are accommodated by an elastomer which may be part of the wedge, or part of the bearing, or part of both.

In the drawing:

FIG. 1 is a longitudinal section through a railway journal box,

FIG. 2 is a transverse section,

Figure 12:
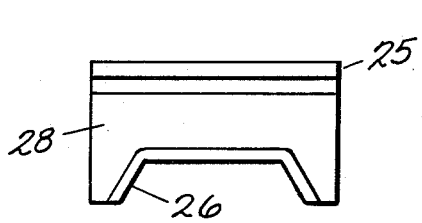
Figure 13:
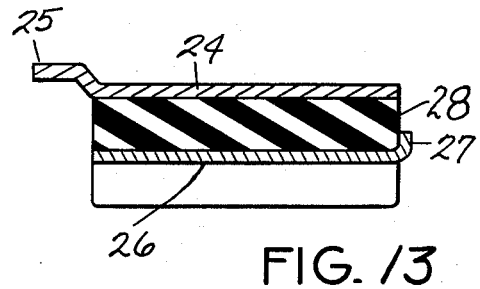
Figure 14:
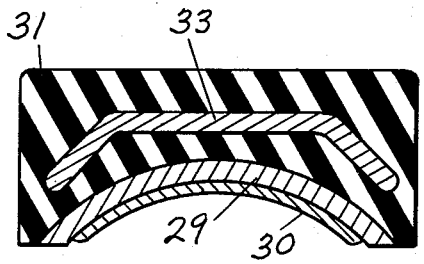
Figure 15:
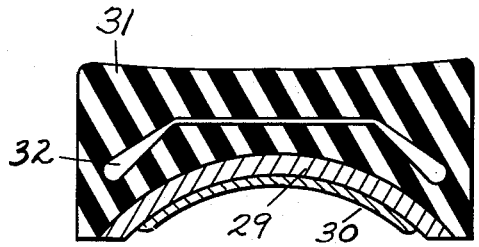

FIG. 3 is a top plan view of a railway journal bearing in which the loads are taken through an elastomer, FIG. 4 is a section on line 4—4 of FIG. 3, FIG. 5 is a section on line 5—5 of FIG. 3, FIG. 6 is a perspective of the core of the wedge shown in FIG. 1, FIG. 7 is a perspective of the wedge shown in FIG. 1, FIG. 8 is a side view of a modification of the wedge, FIG. 9 is a top plan view of the FIG. 8 wedge, FIG. 10 is a plan view of a core similar to that used in FIG. 8, FIG. 11 is an edge view of an elastomeric part which can be assembled to the core of FIG. 10 with or without bonding, FIG. 12 is an end view of a modification of the wedge, FIG. 13 is a section on line 13—13 of FIG. 12, FIG. 14 is a section of a combined wedge and bearing, and FIG. 15 is a section through the FIG. 14 wedge and bearing with the core removed.

The conventional parts are readily identified, 1 being a railway journal box, 2 a journal, 3 a bearing with a bearing lining 4, and 5 the journal box cover held closed by a spring 6. The dust guard and the structure for lubricating the bearing are not shown. The foregoing parts are or may be of common construction.

In the assembly, the journal box is jacked upward relative to the journal and the bearing is set behind the journal collar 7 and held in place by a wedge 8 arranged between a shoulder 9 on the journal bearing and a shoulder 10 on the journal box. The wedge transfers loads from the journal box to the bearing, both laterally and longitudinally with respect to the car. The wedge also accommodates sidewise rocking movement of the car. To perform these functions with the metal wedges heretofore used, the upper surface of the wedge has been crowned to accommodate the lateral rocking of the car and lubrication has been required between both the upper and lower surfaces of the wedge. The crowning of the upper surface has resulted in high stress concentration developing flat top surfaces which interfered with the accommodation of the rocking of the car. Improper lubrication or roughness of the top and bottom surfaces of the wedge caused by handling or by corrosion has interfered with the free sliding of the wedge relative to the journal box, causing jamming and undue pressure and wear of the journal flange.

These difficulties are overcome by the wedge construction shown in FIG. 1 where there is a metal core 11 having one end 12 bearing against the shoulder 10 and the other end 13 downturned to bear against the shoulder 9 of the bearing. The center portion of the core 11 is embedded in and bonded to a body 14 of a suitable elastomer, for example, rubber or polyurethane, having a flat upper surface 15 engaging a corresponding flat surface at the top of the journal box and having a lower surface 16 with downwardly depending sides 17 fitting over and conforming to the upper surface of the bearing 3. The core 11 transmits the load between the shoulders 9 and 10 in the same manner as the conventional metal wedge. The elastomer 14 accommodates the rocking, lateral and longitudinal loads. The elastomer conforms to the surfaces of the journal box and bearing, producing a more uniform load distribution and reducing or eliminating stress concentrations. The elastomer may contain a lubricating filler which will promote relative sliding movement between the elastomer and the surfaces of the bearing and journal box cover if that is necessary. Ordinarily, however, the deflection of the elastomer is sufficient and in service there is no substantial sliding movement relative to the journal box and bearing. The deflection of the elastomer also prevents jamming in case the journal should be forced out of alignment with the associated parts. The elastomer also constitutes a vibration and shock isolating connection for disturbances generated by the wheels. This is particularly effective for the higher frequency components which may generate fatigue producing resonances in the car structure.

FIGS. 3, 4 and 5 show a bearing which may be used either with the conventional metal wedge or with the wedge of FIGS. 1 and 2. The bearing has a metal core 18 of conventional configuration with a shoulder 9a at the back cooperating with the wedge in the same manner as the usual shoulder 9. Bonded to the upper side of the core 10 is a body 19 of elastomer shaped to fit the under side of the wedge. Bonded to the lower side of the core 18 is a layer 20 of elastomer which serves as the bearing lining. The bodies 19 and 20 produce more uniform load distribution on the bearing surface than an all metal bearing. By incorporating lubricating fillers, damage caused by temporary failure of the lubrication is reduced or prevented. The bodies 19 and 20 also have a shock and vibration isolating function, particularly for the higher frequencies.

The wedge shown in FIGS. 8 and 9 has a metal core 11b with a shoulder 12b at the front and a shoulder 13b at the rear respectively cooperating with the shoulders 10 and 9 on the box and bearing. The core 11b is hollow at the center and has fixed thereto a body 14b of rubber or like elastomer. On opposite sides of the center of the core 11b are projections 21 which, when installed in the journal box of FIGS. 1 and 2, make metal-to-metal contact with the sides of the box. The normal operational motions between the journal box and wedge are accommodated by deflection of the body 14b.

The wedge of FIGS. 8 and 9 is conveniently made by molding the rubber body 14b around the core 11b and bonding the rubber to the core as part of the molding operation. FIGS. 10 and 11 show a wedge construction in which the core 11c has at the center a window 22 for receiving a body 14c of suitable elastomer. The body 14c has a peripheral groove 23 which snaps into the edges of the window 22.

FIGS. 12 and 13 show a wedge having an elastomeric core faced with metal. At the top of the wedge is a metal part 24 having a shoulder 25 at the front for cooperation with the shoulder 10 on the journal box. The plate 24 has a flat upper surface which receives the load from the journal box. At the lower side the wedge has a metal plate 26 which conforms to the top surface of the bearing 3. At the rear of the plate 26 is a shoulder 27 which cooperates with the shoulder 9 on the bearing. In load carrying relation between the plates 24 and 26 is a body 28 of suitable elastomer bonded to the adjacent surfaces of the plates. The body 28 has the same function of distributing the load and accommodating the operational movements of the wedge. Because the elastomer deflects under the operational loads, relative sliding between the plates 24, 26 and the journal box and bearing is unnecessary.

In FIGS. 14 and 15 are shown a combined wedge and bearing including an elastomeric body for accommodating the operational loads. The bearing 29 has a lining 30 on its under side and its upper side is bonded to a body 31 of suitable elastomer. The body 31 has a molded slot 32 for receiving a core 33 having the same function as the core 11. The body 31 accommodates the operational loads without requiring any relative movement between the wedge and bearing.

What is claimed as new is:

1. In combination with a railway journal box and bearing, said journal box having a shoulder at the front of the box and said bearing having a shoulder at the back of the box, a wedge having an elastomeric body in load carrying relation between the box and bearing, and a rigid core fastened to the body and extending in thrust transmitting relation between said shoulders.

2. In combination with a railway journal box and bearing, said journal box having a shoulder at the front of the box and said bearing having a shoulder at the back of the box, a wedge having an upper metal plate engaging the top of the journal box and the shoulder at the front of the box, a lower metal plate engaging the upper side of the bearing and the shoulder on the bearing at the back of the box, and a body of elastomer sandwiched between and bonded to said plates.

3. In combination with a railway journal box and bearing, said journal box having a shoulder at the front of the box and said bearing having a shoulder at the back of the box, a wedge having an eastomeric body in load carrying relation between the box and bearing with its upper surface shaped to fit the top of a journal box and its lower surfaces shaped to fit the upper surface of the bearing, and a rigid core fastened to the body and extending in thrust transmitting relation between said shoulders.

4. In combination with a railway journal box and bearing, said journal box having a shoulder at the front of the box and said bearing having a shoulder at the back of the box, a wedge having metal shoulders at opposite ends engaging the first mentioned shoulders and a window between the ends, and a body of elastomer fitting in said window and projecting above and below the window into engagement respectively with the box and bearing.

5. In combination with a railway journal box and bearing, said journal box having a shoulder at the front of the box, a wedge having a body of elastomer with its upper surface arranged to engage the top of the journal box and its lower surface bonded to the upper surface of the bearing, and metal core secured to the elastomer and engaging the shoulder for transferring thrust to the box.

6. In combination with a railway journal box and bearing, said journal box having a shoulder at the front of the box, a wedge having a body of elastomer with its upper surface engaging the top of the box and its lower surfaces bonded to the upper surface of the bearing, said body having a slot between its upper and lower surfaces, and a metal core anchored in said slot and engaging the shoulder for transferring thrust to the box.

7. In combination with a railway journal box and bearing, said journal box having a shoulder at the front of the box and said bearing having a shoulder at the back of the box, a wedge having a metal core with shoulders at opposite ends engaging respectively the shoulder on the box and the shoulder on the bearing, said core further having shoulders engaging the sides of the box, and a body of elastomer anchored to the core and arranged in load carrying relation between the bearing and box.

8. In combination with a railway journal box and bearing, said journal box having a shoulder at the front of the box and said bearing having a shoulder at the back of the box, a wedge having a metal core with shoulders at opposite ends engaging respectively the shoulder on the bearing and the shoulder on the box, said core further having shoulders at the sides for transmitting horizontal thrust to the sides of the box, said core having a window between the shoulders, and a body of elastomer anchored to the core in said window and projecting above and below the core into load carrying relation with the box and bearing.

9. In combination with a railway journal box and bearing, said journal box having a shoulder at the front of the box and said bearing having a shoulder at the back of the box, a wedge having an elastomeric body in load carrying relation between the box and wedge and a rigid core extending in thrust transmitting relation between said shoulders, and said bearing having an elastomeric lining engaging the journal and an elastomeric body in load carrying relation between the bearing and wedge.

References Cited in the file of this patent
UNITED STATES PATENTS

| | | |
|---|---|---|
| 1,904,007 | O'Brien | Apr. 18, 1933 |
| 2,698,208 | Dilg | Dec. 28, 1954 |